US010841357B1

(12) United States Patent
Wey

(10) Patent No.: US 10,841,357 B1
(45) Date of Patent: Nov. 17, 2020

(54) USING TRANSPORT LAYER PROTOCOL PACKET HEADERS TO ENCODE APPLICATION LAYER ATTRIBUTES IN AN AUDIOVISUAL OVER INTERNET PROTOCOL (AVOIP) PLATFORM

(71) Applicant: Dialpad, Inc., San Francisco, CA (US)

(72) Inventor: Dennis Wey, San Francisco, CA (US)

(73) Assignee: DIALPAD, INC., San Francisco, CA (US)

( * ) Notice: Subject to any disclaimer, the term of this patent is extended or adjusted under 35 U.S.C. 154(b) by 0 days.

(21) Appl. No.: 16/569,129

(22) Filed: Sep. 12, 2019

(51) Int. Cl.
*H04L 29/06* (2006.01)

(52) U.S. Cl.
CPC .......... *H04L 65/607* (2013.01); *H04L 69/161* (2013.01)

(58) Field of Classification Search
CPC . H04L 65/40; H04L 65/4007; H04L 65/4015; H04L 65/403; H04L 65/4069; H04L 65/60; H04L 65/601; H04L 65/602; H04L 65/605; H04L 65/607; H04L 65/608; H04L 29/06; H04L 29/06176; H04L 29/06183; H04L 29/0636; H04L 29/06367; H04L 29/06476; H04L 29/06482; H04L 29/06489; H04L 29/06503; H04L 29/0653
See application file for complete search history.

(56) References Cited

U.S. PATENT DOCUMENTS

| | | | | | |
|---|---|---|---|---|---|
| 6,850,496 | B1* | 2/2005 | Knappe | .................. | H04M 3/56 370/260 |
| 7,310,334 | B1* | 12/2007 | FitzGerald | ........ | H04L 29/06027 370/352 |
| 7,764,633 | B2* | 7/2010 | Marque-Pucheu | ..... | H04W 4/10 370/279 |
| 9,838,642 | B2* | 12/2017 | Tariolle | .................. | H04N 5/775 |
| 2004/0076277 | A1* | 4/2004 | Kuusinen | .............. | H04L 65/403 379/202.01 |
| 2007/0115945 | A1* | 5/2007 | Gass | ..................... | H04L 65/607 370/356 |
| 2007/0206579 | A1* | 9/2007 | Voith | .................. | H04L 65/1006 370/356 |
| 2008/0312923 | A1* | 12/2008 | Crinon | .................. | H04L 65/608 704/246 |

(Continued)

*Primary Examiner* — Kevin D Mew
(74) *Attorney, Agent, or Firm* — Patent Law Works LLP

(57) ABSTRACT

Transport layer protocol packet headers are used to encode application layer attributes in the context of an AVoIP platform. An endpoint encodes signaling information in the transport layer protocol packet header of an audiovisual stream, (e.g., in the synchronization source identifier ("SSRC") field of an RTP header). The signaling information may include requests to add or remove the audiovisual stream to/from an existing videoconference, an application layer identifier, and metadata concerning audiovisual content contained in the audiovisual stream such as the resolution, codec, etc. After adding the signaling information, the endpoint transmits the audiovisual stream to a server. The server reads the signaling information that was added to the transport layer protocol packet header, and utilizes this information to add or remove the audiovisual stream to an existing videoconference, without using a separate signaling protocol to negotiate the addition/removal of the audiovisual stream to/from the existing videoconference.

20 Claims, 3 Drawing Sheets

(56) References Cited

U.S. PATENT DOCUMENTS

| | | | | |
|---|---|---|---|---|
| 2010/0080328 A1* | 4/2010 | Johansson | ............... | H04L 65/80 |
| | | | | 375/346 |
| 2010/0177880 A1* | 7/2010 | Danielsen | ........... | H04L 67/2804 |
| | | | | 379/202.01 |
| 2011/0154417 A1* | 6/2011 | Civanlar | .................. | H04N 7/15 |
| | | | | 725/105 |
| 2011/0194460 A1* | 8/2011 | Witzel | .................. | H04M 7/006 |
| | | | | 370/259 |
| 2013/0097470 A1* | 4/2013 | Hwang | ............. | H03M 13/6356 |
| | | | | 714/758 |
| 2013/0163580 A1* | 6/2013 | Vass | ...................... | H04L 65/103 |
| | | | | 370/352 |
| 2014/0028788 A1* | 1/2014 | Halavy | .................. | H04N 7/152 |
| | | | | 348/14.09 |
| 2014/0313289 A1* | 10/2014 | Kim | ................... | H04N 21/2362 |
| | | | | 348/43 |
| 2015/0264103 A1* | 9/2015 | Kim | ...................... | H04L 65/608 |
| | | | | 709/219 |
| 2017/0054770 A1* | 2/2017 | Wells | .................. | H04L 65/1006 |
| 2017/0237708 A1* | 8/2017 | Klaghofer | ............ | H04L 65/1069 |
| | | | | 726/12 |
| 2018/0309616 A1* | 10/2018 | Kollipara | ............ | H04L 41/5067 |

* cited by examiner

USING TRANSPORT LAYER PROTOCOL PACKET HEADERS TO ENCODE APPLICATION LAYER ATTRIBUTES IN AN AUDIOVISUAL OVER INTERNET PROTOCOL (AVOIP) PLATFORM

TECHNICAL FIELD

This disclosure pertains generally to computerized video-telephony, and more specifically to using transport layer protocol packet headers to encode application layer attributes in an Audiovisual over Internet Protocol (AVoIP) platform.

BACKGROUND

An ever larger share of phone calls are made from and processed by computing devices such as smartphones and personal computers. For example, Voice over Internet Protocol (VoIP) enables the delivery of voice communication over Internet Protocol (IP) networks, such as the public internet or private IP networks, as opposed to conventional public switched telephone networks (PSTN). Processing VoIP telephone calls involves signaling, channel setup, digitization of the analog voice signals and encoding. Instead of being transmitted over a circuit switched network, the digital information is packetized, and IP packets are transmitted over a packet switched network. Contemporary providers of VoIP enable dynamic interconnection between users on any two domains on the internet, using VoIP phones, or VoIP software running on personal computers, smartphones or other devices capable of running applications and connecting to a network.

In addition to VoIP, Audiovisual over Internet Protocol (AVoIP) can be used to transmit video as well as audio content between endpoints over an IP network such as the internet. This enables functionality such as real-time video calls and conferences, using software running on personal computers, smartphones or other network enabled devices. AVoIP systems can encode audiovisual content on an endpoint to a bitstream, and transmit that bitstream encapsulated in a stream of IP packets over an IP network such as the internet. The bitstream can subsequently be decoded on a target endpoint, and played back as audiovisual content. The encoding/decoding can utilize conventional audio codecs, and the transmission can leverage Real-time Transport Protocol (RTP) or a variation thereof such as Secure Real-time Transport Protocol (SRTP). VoIP and AVoIP have many advantages over conventional PSTN telephony, including bandwidth efficiency, pricing and convenience.

RTP sessions are typically initiated using a signaling protocol such as Session Initiation Protocol (SIP). In an AVoIP platform there may be a long signaling round trip time (RTT) between the clients (e.g., participants in a video conference) and the media engine (e.g., an SFU or stream forwarding unit). Conventionally, the SFU generally forces every client to renegotiate the connection each time a new participant joins the conference, and each time an existing participant leaves. This tends to become resource intensive, complicated, and error-prone, especially where synchronous signaling is not being used, as is the case with many AVoIP platforms and scenarios. However, under a conventional SFU of the type described above, unless every connection between each client and the server is renegotiated each time a participant joins or leaves a video conference, it is basically impossible to know what each video stream contains (e.g., the resolution, codec, application layer identifier of the originating client, etc.), as this information is typically passed via the signaling protocol during renegotiation.

It would be desirable to address these issues.

SUMMARY

Transport layer protocol packet headers are used to encode application layer attributes in the context of an AVoIP platform. Suppose a user operating an endpoint (client) computing device (e.g., a mobile device or desktop computer) seeks to join an existing audiovisual conference (e.g., an AVoIP video conference call between two or more endpoints). In response to a directive from the user (e.g., via a GUI of an endpoint level AVoIP agent or the like), the endpoint can encode signaling information in the transport layer protocol packet header of an audiovisual stream, (e.g., in the synchronization source identifier ("SSRC") field of an RTP header). The signaling information may include an application layer identifier, and metadata concerning audiovisual content contained in the audiovisual stream such as the format, resolution, codec, etc. After adding the signaling information to the transport layer protocol packet header, the endpoint transmits the audiovisual stream to a server computer.

The server computer receives the audiovisual stream from the endpoint, and reads the signaling information that was added to the transport layer protocol packet header. The server computer may identify the application layer identifier associated with the audiovisual stream that was encoded in the transport layer protocol packet header. The server may then utilizes this information (as well as any additional signaling information such as, e.g., the resolution and/or codec of the audiovisual content) to add the audiovisual stream to the existing videoconference in association with the application layer identifier, without using a separate signaling protocol (e.g., SIP) to negotiate the addition of the audiovisual stream to the existing videoconference.

In some implementations, when a participant wishes to exit the existing video conference, the corresponding endpoint may encode a request to remove the audiovisual stream from the conference in the transport layer protocol packet header, as well as the application layer identifier and any additional information, such as metadata concerning the content audiovisual stream. The server may then identify the application layer identifier and the request to remove the audiovisual stream from the existing videoconference in the transport layer protocol packet header. The server may utilize the signaling information to remove the audiovisual stream from the existing videoconference, without using a separate signaling protocol.

It is to be understood that this functionality can be utilized in videoconferences with large numbers of participants. The signaling information in the transport layer protocol packet headers of the various audiovisual streams of the various participants may be utilized to add and/or remove audiovisual streams to/from the existing videoconference, without requiring that each participant renegotiate its connection each time a participant joins or exits the conference.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected

The Figures depict various example implementations for purposes of illustration only. One skilled in the art will readily recognize from the following discussion that alternative examples of the structures and methods illustrated herein may be employed without departing from the principles described herein.

DETAILED DESCRIPTION

Figure 1:
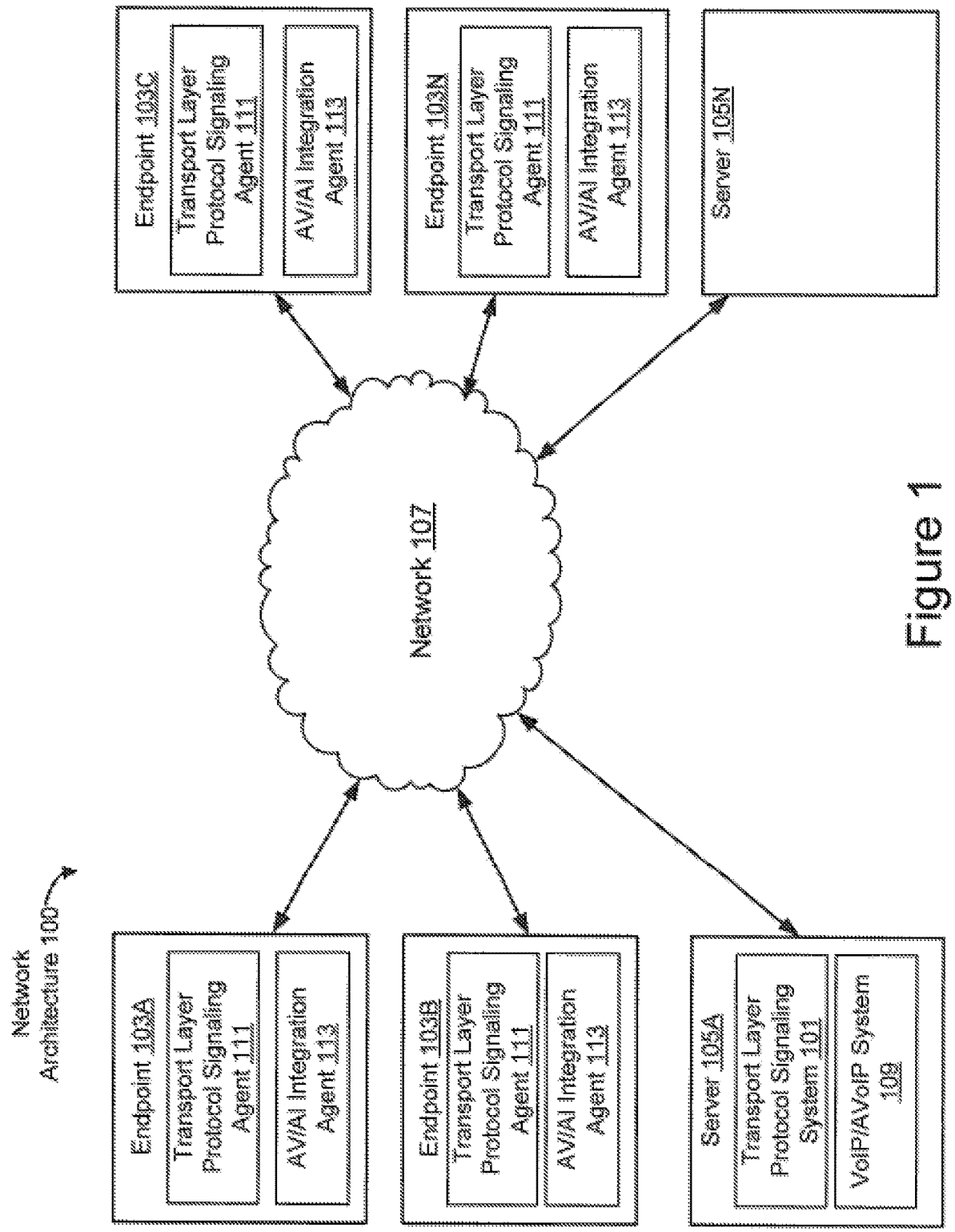
FIG. 1 is a block diagram of an exemplary network architecture in which a transport layer protocol signaling system can be implemented.

FIG. 1 is a block diagram illustrating an exemplary network architecture 100 in which a transport layer protocol signaling system 101 can be implemented. In the illustrated network architecture 100, endpoint systems 103A, 103B, 103C and 103N, as well as servers 105A and 105N, are communicatively coupled to a network 107. A transport layer protocol signaling system 101 is illustrated as residing on server 105A, with a client-side transport layer protocol signaling agent 113 residing on each endpoint, 103A, 103B, 103C and 103N. It is to be understood that in different implementations the transport layer protocol signaling system 101 can reside on different computers 210, or be distributed between multiple computing systems 210 in different ways as desired. Also illustrated in FIG. 1 is an AVoIP system 109 residing on server 105A, and a client-side AVoIP agent 111 residing on each endpoint 103A-N. These components are discussed in more detail below.

Many different networking technologies can be used to provide connectivity from each of endpoint computing devices 103A-N and servers 105A-N to network 107. Some examples include: WAN, LAN, and various wireless technologies (e.g., Mobile WiMAX, LTE, etc.). Endpoint systems 103A-N are able to access applications and/or data on server 105A or 105N using, for example, a web browser or other endpoint software (not shown). Endpoints 103 can be in the form of, for example, desktop computers, laptop computers, smartphones or other mobile or wearable computing devices, comprising portable computing devices capable of connecting to a network 107 and running applications. Servers 105 can be in the form of, for example, rack mounted or tower computers.

Although FIG. 1 illustrates four endpoints 103A-N and two servers 105A-N as an example, in practice many more (or fewer) computers can be deployed as noted above. In one implementation, the network 107 is in the form of the internet. Other networks 107 or network-based environments can be used in addition to or instead of the internet in other implementations.

Figure 2:
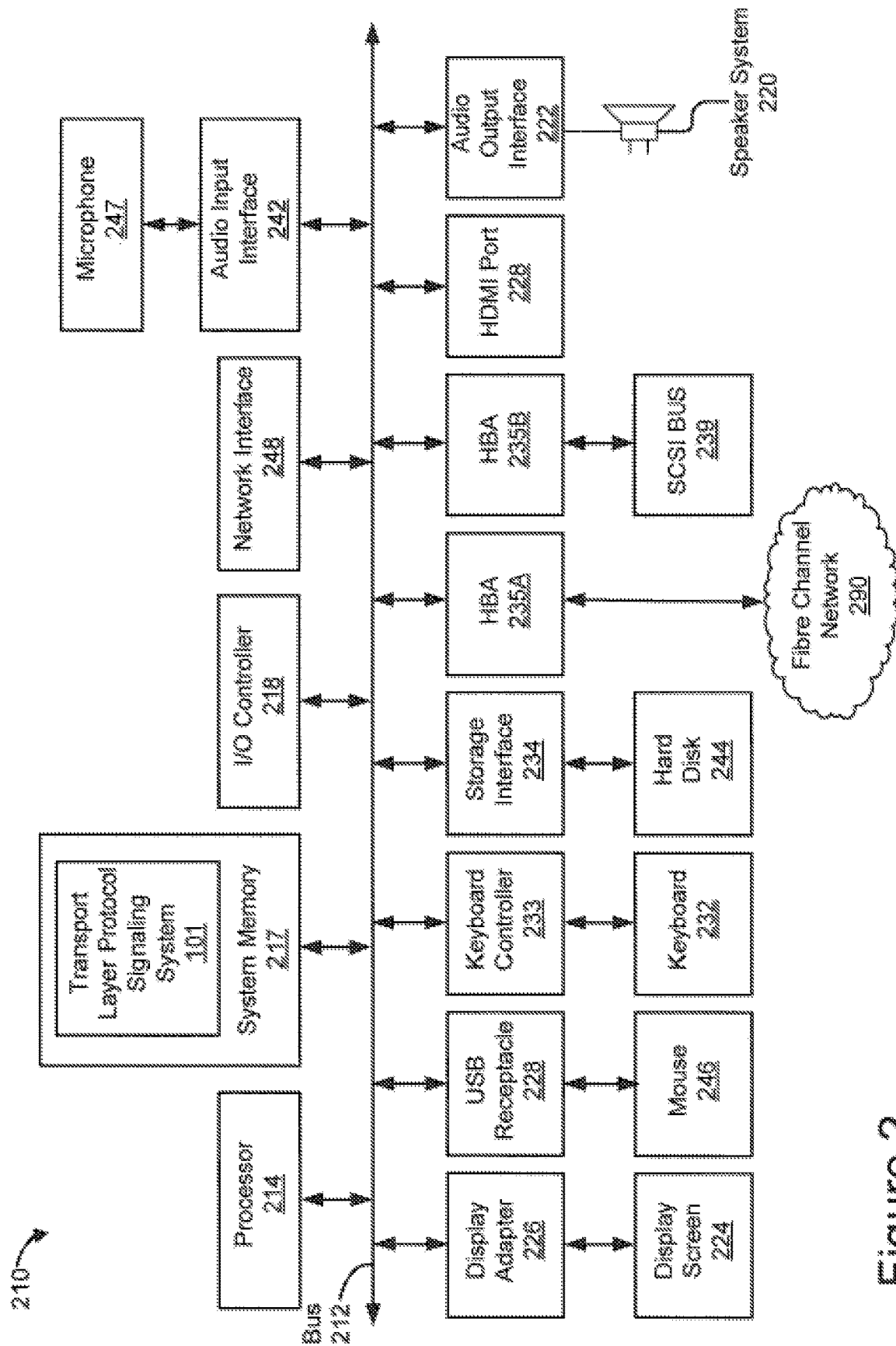
FIG. 2 is a block diagram of a computer system suitable for implementing a transport layer protocol signaling system.

FIG. 2 is a block diagram of a computer system 210 suitable for implementing a transport layer protocol signaling system 101. Endpoints 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio input interface 242 communicatively coupled to an audio input device such as a microphone 247, an audio output interface 222 communicatively coupled to an audio output device such as a speaker 220, a display adapter 226 communicatively coupled to a video output device such as a display screen 224, one or more interfaces such as Universal Serial Bus (USB) ports 228, High-Definition Multimedia Interface (HDMI) ports 230, serial ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, a mouse 246 (or other pointing device) coupled to the bus 212, e.g., via a USB port 228, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have external keyboards 242 or external pointing devices 246, although various external components can be coupled to mobile computing devices via, e.g., USB ports 228). In different implementations the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, solid state drive, flash memory) and loaded into system memory 217 and executed by the processor 214. Application programs can also be loaded into system memory 217 from a remote location (i.e., a remotely located computer system 210), for example via the network interface 248. In FIG. 2, the transport layer protocol signaling system 101 is illustrated as residing in system memory 217. The workings of the transport layer protocol signaling system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 can be directly or indirectly communicatively coupled to a network 107 such as the internet. Such coupling can be wired or wireless.

Figure 3:
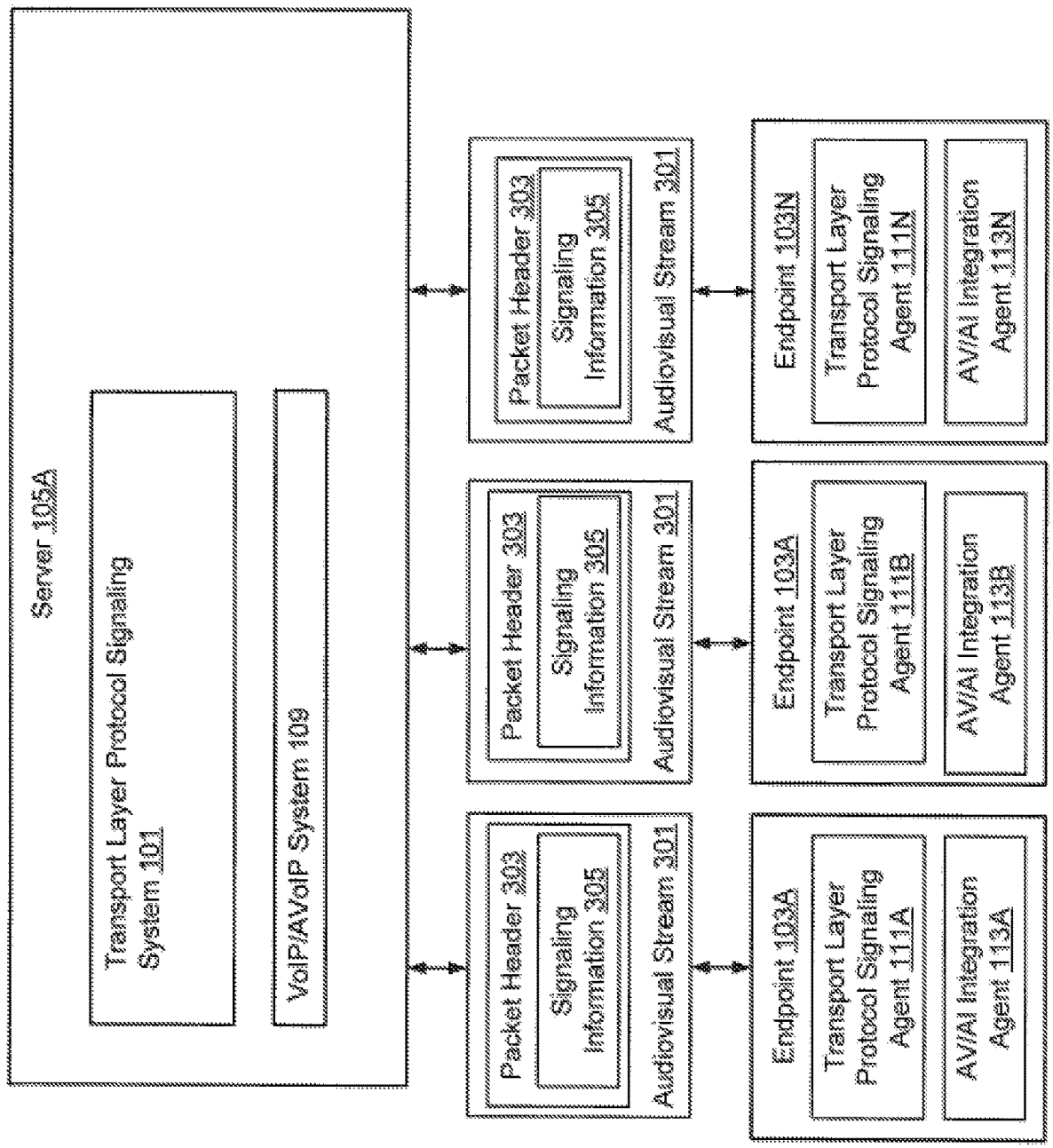
FIG. 3 is a high level block diagram of an exemplary operation of a transport layer protocol signaling system.

FIG. 3 illustrates a transport layer protocol signaling system 101 running on a server 105, with transport layer protocol signaling agents 111A-N running on endpoints 103A-N. As described above, the functionalities of the transport layer protocol signaling system 101 and/or transport layer protocol signaling agents 111 can reside on specific computers 210 (e.g., servers 105, endpoints 103) or be otherwise distributed between multiple computer systems 210, including within a fabric/cloud-based computing environment in which the functionality of the transport layer protocol signaling system 101 is provided as a service over a network 107. It is to be understood that although the transport layer protocol signaling system 101 and transport layer protocol signaling agents 111 are illustrated in FIG. 3 as single entities, the illustrated transport layer protocol signaling system 101 and transport layer protocol signaling agents 111 represent collections of functionalities, which can be instantiated as a single or multiple modules as desired (an instantiation of a specific, multiple module transport layer protocol signaling system 101 is illustrated in FIG. 3). It is to be understood that the modules of the transport layer protocol signaling system 101 can be instantiated (for example as object code or executable images) within the system memory 217 (e.g., RAM, ROM, flash memory) of any computer system 210, such that when the processor(s) 214 of the computer system 210 processes a module, the computer system 210 executes the associated functionality.

As used herein, the terms "computer system," "computer," "endpoint," "endpoint computer," "server," "server computer" and "computing device" mean one or more computers configured and/or programmed to execute the described functionality. Additionally, program code to implement the functionalities of the transport layer protocol signaling system 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

In the example implementation illustrated in FIG. 3, a transport layer protocol signaling system 101 is deployed on the same server 105 as an AVoIP system 109. The specific functionality provided by the AVoIP system 109 can vary between implementations, including example features such as AVoIP endpoint 103 to endpoint 103 connectivity, audiovisual conferencing and calling between any number of endpoints 103, etc. Although FIG. 3 illustrates a single server 105, the transport layer protocol signaling system 101 and the AVoIP system 109 may, in practice, be deployed across multiple servers 105, including at multiple physical locations (e.g., data centers in different cities, countries, continents, etc.). Although the transport layer protocol signaling system 101 and the AVoIP system 109 are illustrated in FIG. 3 as separate entities, in some implementations the transport layer protocol signaling system 101 may be instantiated as a component of the AVoIP system 109, or share varying degrees of functionality with the AVoIP system 109 as desired.

FIG. 3 illustrates both client-side transport layer protocol signaling agents 113 and client-side AVoIP agents 111 running on the endpoints 103A-N. Client-side AVoIP agents 111 can provide client-side AVoIP and general audiovisual telephony functionality, such as user interfaces for participating in audiovisual calls, on endpoint-level computing devices 103 such as desktops, laptops, smartphones, etc. A client-side transport layer protocol signaling agent 113 may be instantiated as a component of a client-side AVoIP agent 111, or may share various functionality therewith, in different implementations.

In the course of providing AVoIP services to multiple endpoints 103, the AVoIP system 109 processes AVoIP media streams of audiovisual content (audio for voice calls, audio and video for video conferences, etc.). For clarity of expression and to avoid excessive redundancy of language, as the term is used herein, "audiovisual content" may mean either audio plus video, audio only, or video only. Likewise, the term "audiovisual call" is used herein to mean a voice call (e.g., a VoIP call) or a video call (e.g., with a video component as well, such as an AVoIP call including both audio and video). An audiovisual call can be between two endpoints 103 or more than two endpoints 103 (e.g., a multiparty conference call) as desired.

To provide an example use case of the transport layer protocol signaling system 101 in conjunction with the configuration illustrated in FIG. 3, suppose endpoints 103B and 103N are engaged in a videoconference, which is being processed by the AVoIP system 109 residing on server 105. According to one implementation, in order for endpoint 103A to join the existing videoconference, the client-side transport layer protocol signaling agent 113A running on endpoint 103A encodes signaling information 305 in a transport layer protocol packet header 303 of a corresponding audiovisual stream 301 (e.g., an audiovisual stream being generated by the local client-side AVoIP agent 111A using a local video camera and microphone on endpoint 103A). The audiovisual stream 301 is in a transport layer protocol suitable for AVoIP communication (e.g., RTP, Secure Real-time Transport Protocol (SRTP), etc.).

Conventionally, the signaling information would be provided not in the transport layer protocol stream 301, but instead using a separate signaling protocol (e.g., SIP) as described above. By contrast, in the use case of the transport layer protocol signaling system 101 being described in conjunction with FIG. 3, the client-side transport layer protocol signaling agent 113A on endpoint 103A encodes the signaling information 305 directly in the transport layer protocol packet header 303 in the audiovisual stream 301. For example, in one implementation, the client-side transport layer protocol signaling agent 113A encodes the signaling information 305 in a synchronization source identifier ("SSRC") field of an RTP header 303. Conventionally, the value of an SSRC is a randomly generated identifier meant to be globally unique within a particular RTP session, to prevent collisions when demultiplexing on a single port. Thus, the SSRC field of an RTP header 303 is conventionally used to identify the source of a stream 301 at the transport layer. By contrast, the client-side transport layer protocol signaling agent 113A can write an application layer identifier associated with the audiovisual conference participant/source of the audiovisual stream 301 (e.g., the instance of the client-side AVoIP agent 111A on endpoint 103A being operated by a user) to the SSRC field of the RTP header 303. Additionally, the client-side transport layer protocol signaling agent 113A may write other application layer-information to the to the SSRC field of the RTP header 303, such as a request to add (or remove) the audiovisual stream 301 from a given call or conference, as well as metadata concerning audiovisual content contained in the audiovisual stream 301, such as the format, resolution, codec, etc. It is to be understood that the specific application layer information to include in the transport layer protocol header 303 can vary between implementations. In some implementations, one or more transport layer protocol header fields other than or in addition to the SSRC field of an RTP header 303 are used in this context.

Once the signaling information 305 has been added to the transport layer protocol packet header 303, the client-side transport layer protocol signaling agent 113A on endpoint 103A can transmit the audiovisual stream 301 to the transport layer protocol signaling system 101 on the server 105. As described in detail below, the transport layer protocol signaling system 101 can utilize the signaling information 305 in the transport layer protocol packet header 303 to add the audiovisual stream 301 to an existing videoconference, without using a separate signaling protocol (e.g., SIP) to negotiate the addition of the audiovisual stream 301 to the existing videoconference.

The transport layer protocol signaling system 101 on the server 105 can receive the audiovisual stream 301 in the transport layer protocol from endpoint 103A. The transport layer protocol signaling system 101 can then read the signaling information 305 which was added to the transport layer protocol packet header 303 of the received audiovisual stream 301 by client-side transport layer protocol signaling agents 113A on endpoint 103A. The transport layer protocol signaling system 101 can utilize this signaling information 305 in the transport layer protocol packet header 303 to add the audiovisual stream 301 from endpoint 103A to the existing videoconference in which endpoints 103B and 103N are already participating, without using a separate signaling protocol such as SIP to negotiate the addition of the audiovisual stream 301 to the existing videoconference. This enables endpoint 103A to be added to the audiovisual conference without requiring that endpoints 103B and 103N renegotiate their connections. In other words, the use of the transport layer protocol signaling system 101 as described herein eliminates the necessity for each conference participant to renegotiate its connection every time a participant joins or exits the conference. Because it is not necessary for each endpoint to the videoconference to renegotiate whenever a new party enters (or leaves, as described below), thereby avoiding this complicated, error prone renegotiation process.

The reading of the signaling information 305 from the transport layer protocol packet header 303 of the received audiovisual stream 301 by the transport layer protocol signaling system 101 can take the form of reading the signaling information 305 from the SSRC field of an RTP header 303, as described above. The signaling information 305 may include an application layer identifier, as well as additional information such as metadata concerning audiovisual content contained in the audiovisual stream 301 (e.g., format, resolution, codec, etc.).

In the example use case described above in which endpoint 103A is seeking to join the existing videoconference, when reading the signaling information 305 in the transport layer protocol packet header 303, the transport layer protocol signaling system 101 on server 105 may identify a request in the signaling information 305 to add the audiovisual stream 301 from endpoint 103A to the existing videoconference. The transport layer protocol signaling system 101 further identifies an application layer identifier for the audiovisual stream 301 in the signaling information 305 in the transport layer protocol packet header 303, and uses this information to add the audiovisual stream 301 to the existing videoconference, in association with the application layer identifier. Endpoint 103A is then in the videoconference with endpoints 103B and 103N.

Continuing with the example use case being described in conjunction with FIG. 3, suppose the user operating endpoint 103B decides to leave the videoconference. In this instance, by, e.g., interacting with a graphical user interface (GUI) of the client-side AVoIP agent 111B residing on endpoint 103B, the user could enter a command to exit the videoconference (e.g., by clicking an "Exit Conference" button or otherwise selecting an appropriate GUI component). This may result in the corresponding client-side transport layer protocol signaling agent 113B residing on endpoint 103B encoding signaling information 305 comprising a request to remove the audiovisual stream 301 originating from client 103B in the transport layer protocol packet header 303 of an audiovisual stream 301 (e.g., the SSRC field of an RTP header 303), along with the corresponding application layer identifier and any metadata concerning the audiovisual stream 301.

In response to reading the request to remove endpoint 103B from the videoconference in the transport layer protocol packet header 303 of the audiovisual stream 301, the transport layer protocol signaling system 101 may remove the audiovisual stream 301 associated with endpoint 103B (as identified by the encoded application layer identifier) from the existing videoconference, without using a separate signaling protocol to negotiate the removal, and without requiring the other endpoints (103B and 103N) participating in the audiovisual conference to renegotiate their connections. Although only three endpoints 103A-N are illustrated in FIG. 3, in other scenarios more (including orders of magnitude more) endpoints 103 can interact with the transport layer protocol signaling system 101.

It is to be understood that other use cases for the transport layer protocol signaling system 101 functionality described above are possible. For example, in one scenario each participant in an audiovisual conference is associated with two video streams 301 (e.g., a low resolution thumbnail image, and a high resolution real-time video stream). In this example scenario, the AVoIP system 109 could display either the thumbnail image or the high resolution stream 301 for each given participant on the videoconference GUI (i.e., the screen that each participant views on his/her respective endpoint 103), depending upon which participant is presently talking (and/or who has recently talked, etc.). Instead of using a separate switching protocol to match the packets of the respective audiovisual streams 301 to the conference participants with all of the associated renegotiation, the transport layer protocol signaling system 101 is able to read the signaling information 305 embedded in the headers 303 of the transport layer protocol audiovisual streams 301 to identify the sources of the audiovisual streams 301 and their corresponding resolutions, and match the packets to the appropriate participants to the desired slots in the videoconference GUI. This is just another example use case; many others are contemplated and possible.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures, and other aspects are not mandatory, and the mechanisms that implement the invention or its features may have different names, divisions and/or formats. The foregoing description, for purpose of explanation, has been described with reference to specific examples. However, the illustrative discussions above are not intended to be exhaustive or limiting to the precise forms disclosed. Many modifications and variations are possible in view of the above teachings. The examples were chosen and described in order to best explain relevant principles and their practical applications, to thereby enable others skilled in the art to best utilize various examples with or without various modifications as may be suited to the particular use contemplated.

What is claimed is:

1. A computer implemented method, comprising:
receiving, by a server computer, an audiovisual stream from a client computing device, the audiovisual stream being in a transport layer protocol;
reading, by the server computer, signaling information from a transport layer protocol packet header of the received audiovisual stream, the signaling information having been added to the transport layer protocol packet header by the client computer; and
utilizing, by the server computer, the signaling information in the transport layer protocol packet header to add or remove the audiovisual stream to an existing videoconference, without using a separate signaling protocol to negotiate the addition to or removal from the existing videoconference of the audiovisual stream.

2. The method of claim 1 wherein the video conference further comprises:
an audiovisual over internet protocol (AVoIP) conference call between more than two endpoints.

3. The method of claim 1 wherein the transport layer protocol further comprises:
Real-Time Transport Protocol (RTP).

4. The method of claim 3 wherein reading, by the server computer, signaling information from the transport layer protocol packet header of the received audiovisual stream, the signaling information having been added to the transport layer protocol packet header by the client computer, further comprises:
reading, by the server computer, the signaling information from a synchronization source identifier ("SSRC") field of an RTP header, the signaling information having been added to the SSRC field of the RTP header by the client computer.

5. The method of claim 1 wherein the signaling information in the transport layer protocol packet header of the received audiovisual stream further comprises:
an application layer identifier.

6. The method of claim 1 wherein the signaling information in the transport layer protocol packet header of the received audiovisual stream further comprises:
metadata concerning audiovisual content contained in the audiovisual stream.

7. The method of claim 6 wherein the metadata concerning the audiovisual content contained in the audiovisual stream further comprises at least one item from a group consisting of:
a format, a resolution, and a codec.

8. The method of claim 1 wherein the signaling information in the transport layer protocol packet header of the received audiovisual stream further comprises:
a request to add the audiovisual stream to the existing videoconference or a request to remove the audiovisual stream from the existing videoconference.

9. The method of claim 1 wherein utilizing, by the server computer, the signaling information in the transport layer protocol packet header to add or remove the audiovisual stream to an existing videoconference, without using a separate signaling protocol to negotiate the addition to or removal from the existing videoconference of the audiovisual stream, further comprises:
identifying a request to add the audiovisual stream to the existing videoconference, in the signaling information in the transport layer protocol packet header;
identifying an application layer identifier associated with the audiovisual stream, in the signaling information in the transport layer protocol packet header; and
adding the audiovisual stream to the existing videoconference, in association with the application layer identifier.

10. The method of claim 1 wherein utilizing, by the server computer, the signaling information in the transport layer protocol packet header to add or remove the audiovisual stream to an existing videoconference, without using a separate signaling protocol to negotiate the addition to or removal from the existing videoconference of the audiovisual stream, further comprises:
identifying a request to remove the audiovisual stream from the existing videoconference, in the signaling information in the transport layer protocol packet header;
identifying an application layer identifier associated with the audiovisual stream, in the signaling information in the transport layer protocol packet header; and
removing the audiovisual stream from the existing videoconference, in association with the application layer identifier.

11. A computer implemented method, comprising:
encoding, by a client computing device, signaling information in a transport layer protocol packet header of an audiovisual stream, the audiovisual stream being in a transport layer protocol; and
transmitting the audiovisual stream to a server computer by the client computing device, the signaling information having been added to the transport layer protocol packet header by the client computer, wherein the signaling information in the transport layer protocol packet header is utilized to add or remove the audiovisual stream to an existing videoconference, without using a separate signaling protocol to negotiate the addition to or removal from the existing videoconference of the audiovisual stream.

12. The method of claim 11 wherein the video conference further comprises:
an audiovisual over internet protocol (AVoIP) conference call between more than two endpoints.

13. The method of claim 11 wherein the transport layer protocol further comprises:
Real-Time Transport Protocol (RTP).

14. The method of claim 13 wherein encoding, by the client computing device, signaling information in the transport layer protocol packet header of an audiovisual stream, the audiovisual stream being in a transport layer protocol, further comprises:
encoding, by the client computing device, signaling information in a synchronization source identifier ("SSRC") field of an RTP header.

15. The method of claim 11 wherein the signaling information encoded, by the client computing device, in the transport layer protocol packet header of the audiovisual stream further comprises:
an application layer identifier.

16. The method of claim 11 wherein the signaling information encoded, by the client computing device, in the transport layer protocol packet header of the audiovisual stream further comprises:
metadata concerning audiovisual content contained in the audiovisual stream.

17. The method of claim 16 wherein the metadata concerning the audiovisual content contained in the audiovisual stream further comprises at least one item from a group consisting of:
a format, a resolution, and a codec.

18. The method of claim 11 wherein the signaling information in the transport layer protocol packet header of the received audiovisual stream further comprises:

a request to add the audiovisual stream to the existing videoconference or a request to remove the audiovisual stream from the existing videoconference.

19. The method of claim 11 wherein utilizing the signaling information in the transport layer protocol packet header to add or remove the audiovisual stream to an existing videoconference, without using a separate signaling protocol to negotiate the addition to or removal from the existing videoconference of the audiovisual stream, further comprises:

identifying a request to add the audiovisual stream to the existing videoconference, in the signaling information in the transport layer protocol packet header;

identifying an application layer identifier associated with the audiovisual stream, in the signaling information in the transport layer protocol packet header; and adding the audiovisual stream to the existing videoconference, in association with the application layer identifier.

20. The method of claim 11 wherein utilizing the signaling information in the transport layer protocol packet header to add or remove the audiovisual stream to an existing videoconference, without using a separate signaling protocol to negotiate the addition to or removal from the existing videoconference of the audiovisual stream, further comprises:

identifying a request to remove the audiovisual stream from the existing videoconference, in the signaling information in the transport layer protocol packet header;

identifying an application layer identifier associated with the audiovisual stream, in the signaling information in the transport layer protocol packet header; and removing the audiovisual stream from the existing videoconference, in association with the application layer identifier.

* * * * *